United States Patent
Zhang et al.

(10) Patent No.: US 8,300,398 B2
(45) Date of Patent: Oct. 30, 2012

(54) HARD DISK DRIVE HOLDER

(75) Inventors: Guang-Yi Zhang, Shenzhen (CN); Jia-Qi Fu, Shenzhen (CN); Wei Qiu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 47 days.

(21) Appl. No.: 12/982,885

(22) Filed: Dec. 31, 2010

(65) Prior Publication Data

US 2012/0097623 A1  Apr. 26, 2012

(30) Foreign Application Priority Data

Oct. 21, 2010  (CN) .......................... 2010 1 0514521

(51) Int. Cl.
*H05K 7/14* (2006.01)

(52) U.S. Cl. ................. 361/679.33; 312/223.2

(58) Field of Classification Search ............... 211/26; 312/223.1, 223.2, 333; 361/679.32, 679.33, 361/679.35, 679.36, 679.37, 679.38, 679.39
See application file for complete search history.

(56) References Cited

U.S. PATENT DOCUMENTS

| | | | | |
|---|---|---|---|---|
| 6,560,098 B1 * | 5/2003 | Beinor et al. | ............ | 361/679.39 |
| 6,661,651 B1 * | 12/2003 | Tanzer et al. | ............ | 361/679.33 |
| 6,798,650 B2 * | 9/2004 | Reznikov et al. | ........ | 361/679.33 |
| 6,876,547 B2 * | 4/2005 | McAlister | ................ | 361/679.33 |
| 6,952,341 B2 * | 10/2005 | Hidaka et al. | ............ | 361/679.32 |
| 7,256,989 B2 * | 8/2007 | Liu et al. | ................... | 361/679.33 |
| 7,321,489 B2 * | 1/2008 | McAlister | ................ | 361/679.33 |
| 7,423,869 B2 * | 9/2008 | Su | ............................ | 361/679.33 |
| 7,480,137 B1 * | 1/2009 | Jyh | ............................. | 361/679.33 |
| 7,511,953 B2 * | 3/2009 | Tao et al. | ................. | 361/679.39 |
| 7,684,182 B2 * | 3/2010 | Zhang et al. | ............. | 361/679.33 |
| 7,701,703 B2 * | 4/2010 | Peng et al. | ............... | 361/679.33 |
| 7,782,606 B2 * | 8/2010 | Baker et al. | ............. | 361/679.39 |
| 7,791,871 B2 * | 9/2010 | Peng et al. | ............... | 361/679.33 |
| 7,808,777 B2 * | 10/2010 | Luo | .......................... | 361/679.37 |
| 7,835,148 B2 * | 11/2010 | Tu | ............................ | 361/679.39 |
| 7,848,096 B2 * | 12/2010 | Peng et al. | ............... | 361/679.33 |
| 7,848,099 B1 * | 12/2010 | Zhang et al. | ............. | 361/679.38 |
| 7,864,522 B1 * | 1/2011 | Peng et al. | ............... | 361/679.33 |
| 7,924,557 B2 * | 4/2011 | Li | ............................ | 361/679.37 |
| 7,974,088 B2 * | 7/2011 | Li | ............................ | 361/679.37 |
| 8,009,416 B2 * | 8/2011 | Kang | ...................... | 361/679.38 |
| 8,023,263 B2 * | 9/2011 | Crippen et al. | .......... | 361/679.58 |
| 8,035,961 B2 * | 10/2011 | Figuerado et al. | ....... | 361/679.37 |

(Continued)

*Primary Examiner* — Darnell Jayne
*Assistant Examiner* — Joshua Rodden
(74) *Attorney, Agent, or Firm* — Altis Law Group, Inc.

(57) ABSTRACT

An exemplary holder for a hard disk drive includes a mounting frame and a handle. The mounting frame includes a first mounting arm, a second mounting arm, a connecting arm, and a clipping assembly. One end of the handle is pivotally connected with one end of the connecting arm. The clipping assembly is attached at another end of the connecting arm. The clipping assembly includes a base, a button, a elastic member and a sliding member. The button is slidable in the connecting arm. The resilient member is located between and abuts against the button and the base. One end of the sliding member is pivotally connected with the connecting arm. Another end of the sliding member is slidably connected with the button. The sliding member defines a locking groove, and the other end of the handle forms a locking hook received in the locking groove of the sliding member.

16 Claims, 10 Drawing Sheets

U.S. PATENT DOCUMENTS

| | | | | |
|---|---|---|---|---|
| 8,050,027 B2* | 11/2011 | Liang | | 361/679.37 |
| 8,070,125 B2* | 12/2011 | Sun | | 248/560 |
| 8,087,739 B2* | 1/2012 | Chen | | 312/332.1 |
| 8,091,838 B2* | 1/2012 | Sun | | 248/27.1 |
| 8,118,271 B2* | 2/2012 | Peng et al. | | 248/222.11 |
| 8,154,863 B2* | 4/2012 | Yang et al. | | 361/679.38 |
| 2003/0206402 A1* | 11/2003 | Tsuyuki et al. | | 361/725 |
| 2007/0159786 A1* | 7/2007 | Liu et al. | | 361/685 |
| 2007/0211422 A1* | 9/2007 | Liu et al. | | 361/685 |
| 2007/0230105 A1* | 10/2007 | Su | | 361/685 |
| 2008/0013272 A1* | 1/2008 | Bailey et al. | | 361/685 |
| 2009/0059507 A1* | 3/2009 | Peng et al. | | 361/685 |
| 2010/0187957 A1* | 7/2010 | Liang | | 312/223.2 |
| 2010/0284145 A1* | 11/2010 | Kang | | 361/679.58 |
| 2010/0295427 A1* | 11/2010 | Li | | 312/223.2 |
| 2010/0302722 A1* | 12/2010 | Kang | | 361/679.31 |
| 2010/0321879 A1* | 12/2010 | Peng et al. | | 361/679.33 |
| 2011/0074259 A1* | 3/2011 | Chen | | 312/223.2 |
| 2011/0101831 A1* | 5/2011 | Wang et al. | | 312/223.1 |

* cited by examiner

HARD DISK DRIVE HOLDER

BACKGROUND

1. Technical Field

The disclosure generally relates to device mounting, and more particularly, to a holder for fixing a hard disk drive (HDD) of an electronic device in an enclosure of the electronic device.

2. Description of Related Art

Often, an HDD is installed in an enclosure of an electronic device in an HDD holder. The HDD holder typically includes a main body for receiving the HDD, and a longitudinal handle with one end pivotally connected with the main body. The handle forms a locking leg at the one end thereof. The enclosure defines a latching groove for receiving the locking leg. During installation of the HDD holder into the enclosure, the locking leg of the handle of the HDD holder is received in the latching groove of the enclosure, and the other end of the handle is secured on the main body by fasteners, to complete assembly of the HDD holder to the enclosure. However, the fasteners must be individually threaded into the main body one by one, thus the installation of the HDD into the enclosure is inconvenient and time-consuming.

What is needed, therefore, is an improved HDD holder which can overcome the limitations described.

DETAILED DESCRIPTION

Figure 1:
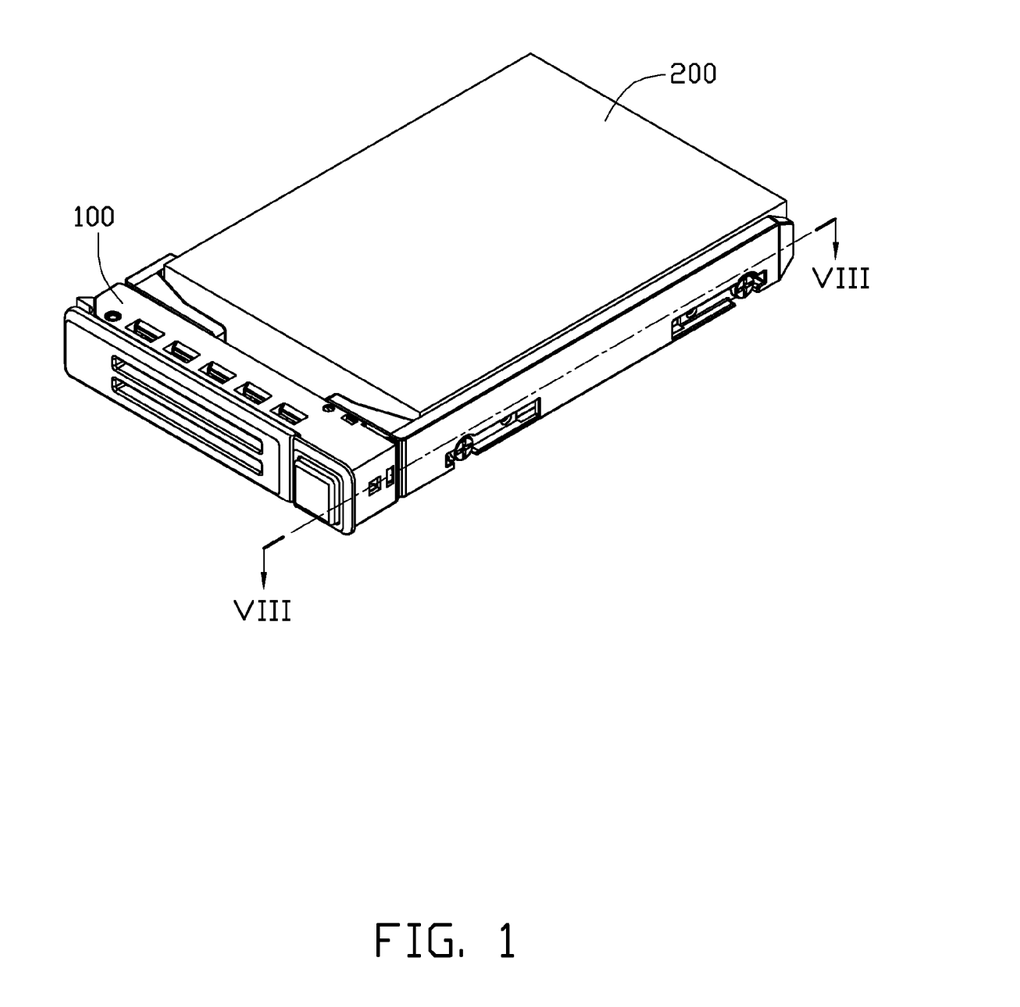
FIG. 1 is an isometric, assembled view of an HDD holder with an HDD fixed thereon, the HDD holder being in accordance with an exemplary embodiment of the disclosure.
Figure 10:
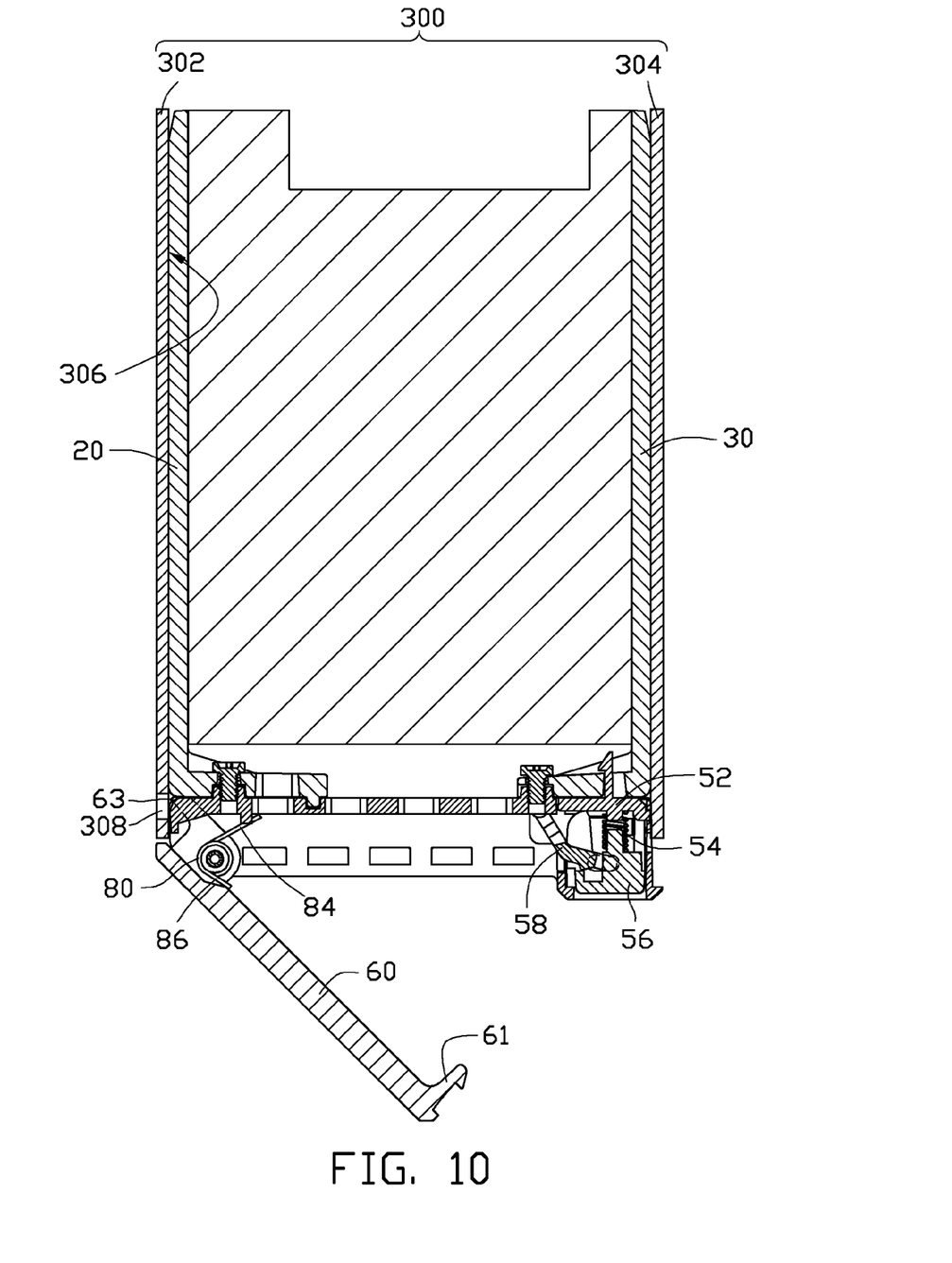
FIG. 10 is similar to FIG. 9, but shows the HDD holder assembled into an enclosure, with the HDD holder in the unlocked state.

Referring to FIGS. 1 and 10, an HDD holder 100 according to an exemplary embodiment of the disclosure is shown. The HDD holder 100 is adapted for fixing a HDD 200 to an enclosure 300 of an electronic device. FIG. 10 only shows a portion of the enclosure 300 for clarity. The enclosure 300 includes a first sidewall 302, and a second sidewall 304 parallel to and spaced from the first sidewall 302. A receiving space 306 is defined between the first sidewall 302 and the second sidewall 304, for receiving the combined HDD holder 100 and HDD 200. The first sidewall 302 defines a latching groove 308 adjacent to a front end thereof.

Figure 2:
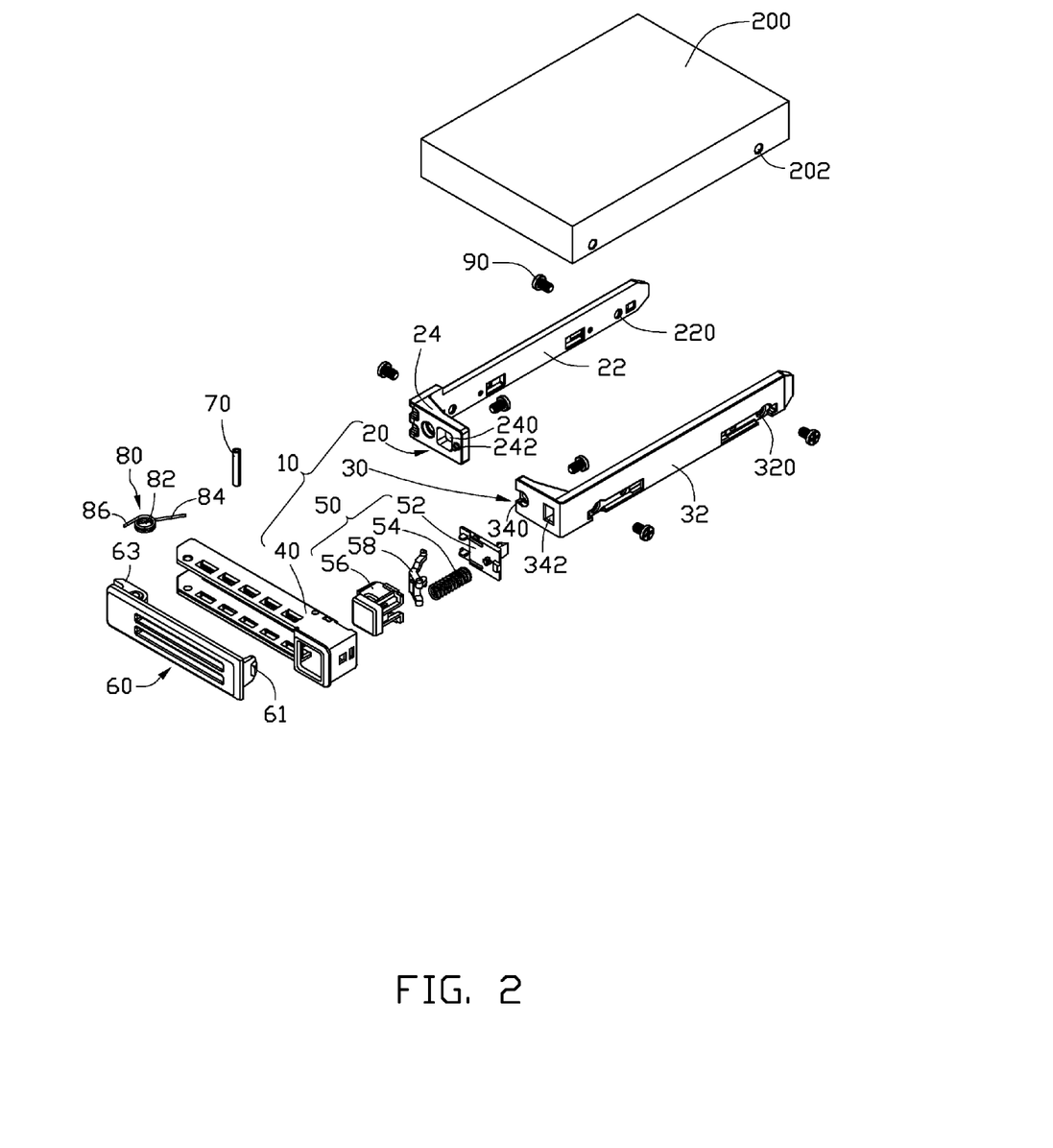
FIG. 2 is an exploded view of the HDD holder and the HDD of FIG. 1.
Figure 3:
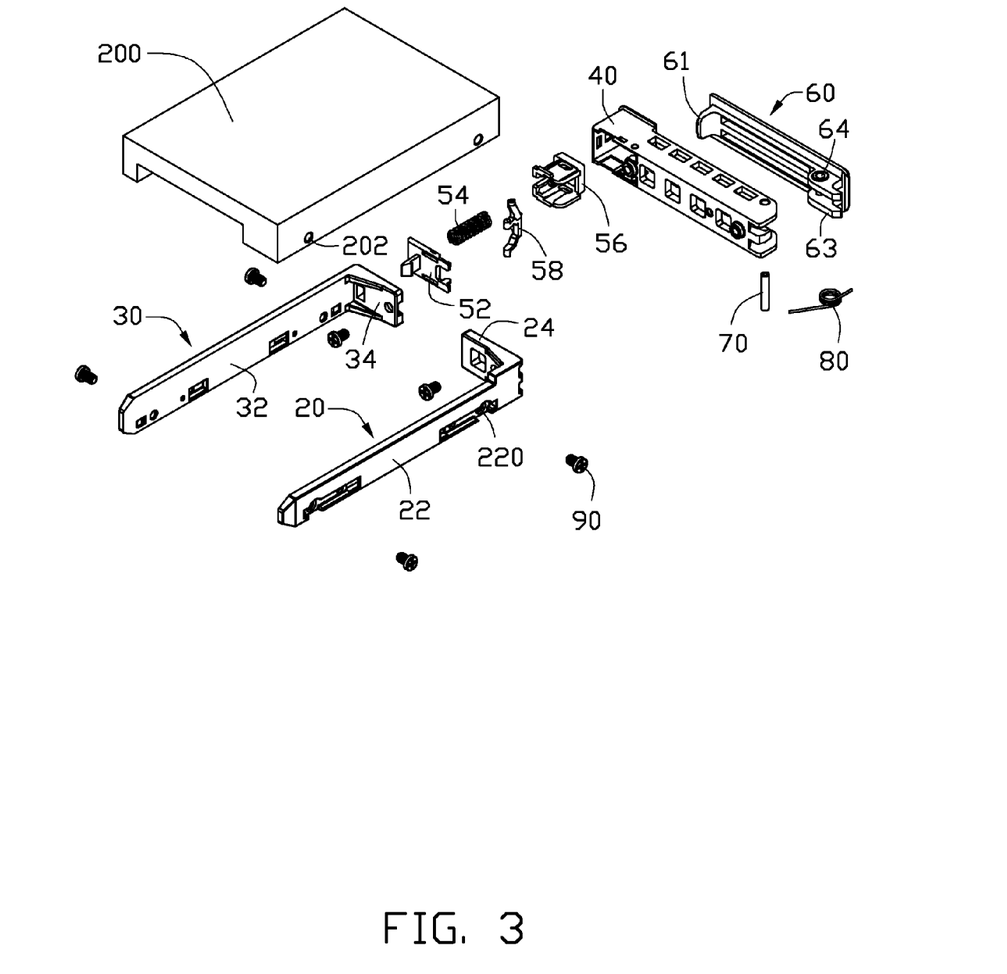
FIG. 3 is similar to FIG. 2, but viewed from another aspect.

Referring also to FIGS. 2 and 3, the HDD 200 defines a plurality of fixing holes 202 at two opposite lateral sides thereof. The HDD holder 100 includes a mounting frame 10, a handle 60, a shaft 70 and a resilient member 80. The handle 60 is pivotally connected with the mounting frame 10 by the shaft 70 and the resilient member 80. In this embodiment, the resilient member 80 is a torsion spring. The resilient member 80 includes a hollow main portion 82, and a first arm 84 and a second arm 86 extending along different directions from top and bottom sides of the main portion 82.

The handle 60 is elongate, and has two opposite ends. One end of the handle 60 forms a locking hook 61, and the other end forms two locking legs 63. The locking legs 63, located horizontally, are parallel to and spaced from each other. Each locking leg 63 includes an outer side protruding outwardly, and an inner side defining a pivotal hole 64 therein. The pivotal holes 64 of the two locking legs 63 are aligned.

The mounting frame 10 includes a first mounting arm 20, a second mounting arm 30, a connecting arm 40 connecting the first mounting arm 20 with the second mounting arm 30, and a clipping assembly 50 received in the connecting arm 40 and abutting against the second mounting arm 30.

Each of the first and second mounting arms 20, 30 is L-shaped, and includes an elongate main section 22, 32, and a fixing section 24, 34 extending perpendicular from a front end of the main section 22, 32. The main sections 22, 32 are parallel to and spaced from each other. The fixing sections 24, 34 are located in line, and extend toward but are spaced from each other. Each main section 22, 32 defines two mounting holes 220, 320 therein for fixing the HDD 200. The fixing section 24 of the first mounting arm 20 forms an engaging post 242 thereon and defines a circular securing hole 240 therein. The fixing section 34 of the second mounting arm 30 defines a circular securing hole 340, and a rectangular positioning hole 342 beside the securing hole 340.

Figure 4:
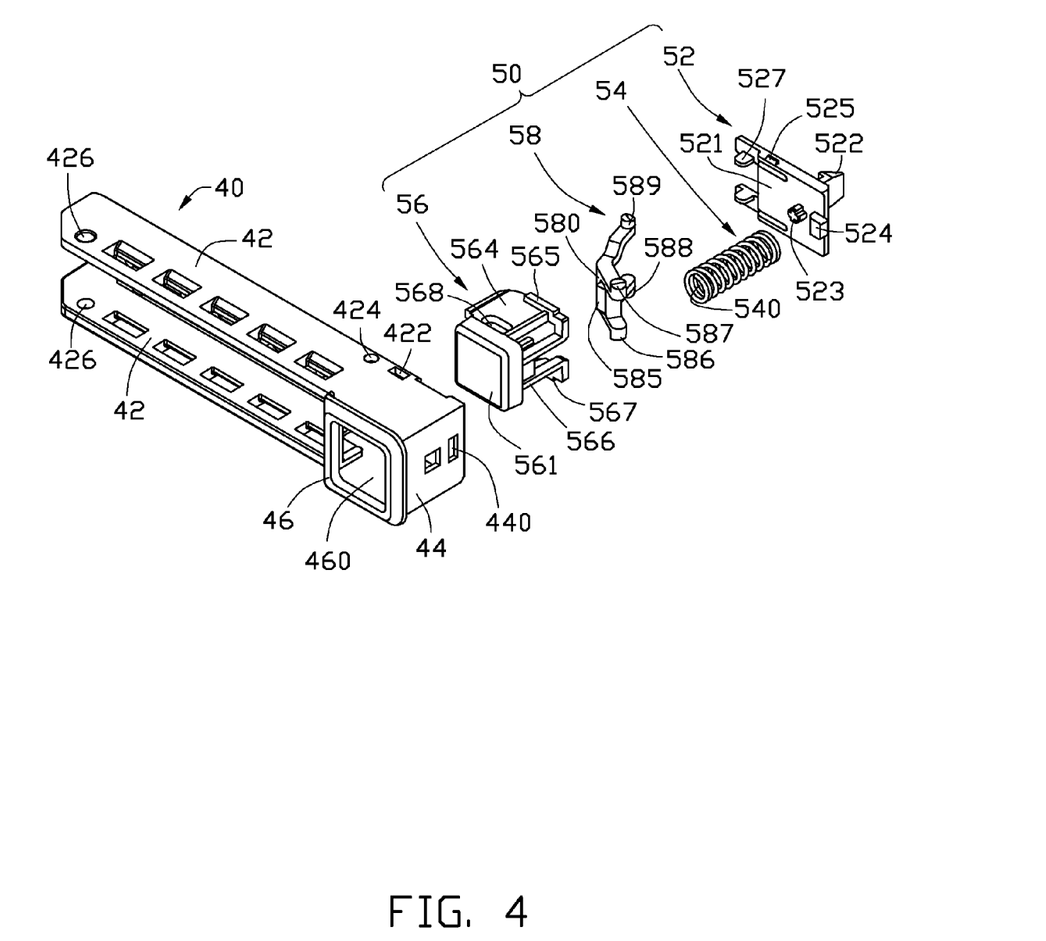
FIG. 4 is an enlarged view of a connecting arm and a clipping assembly of the HDD holder of FIG. 2.
Figure 5:
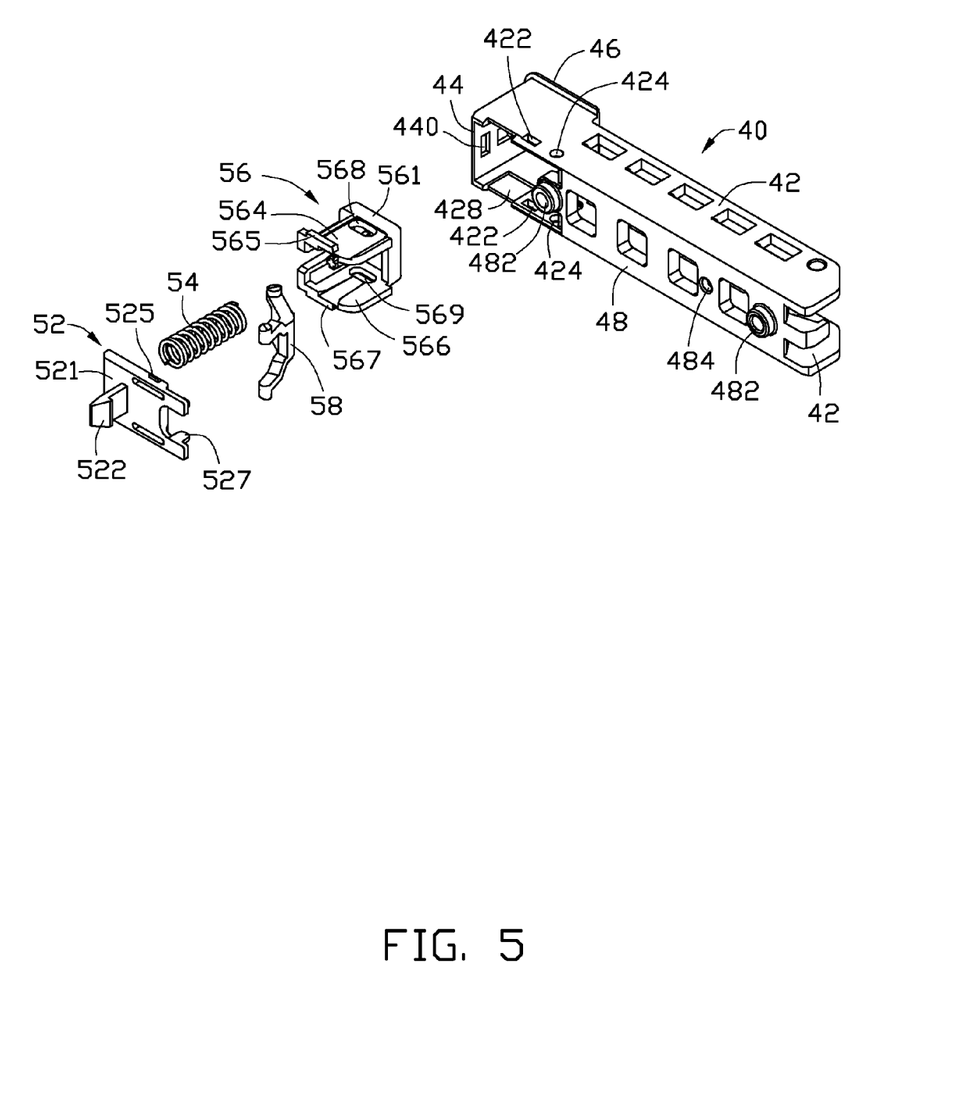
FIG. 5 is similar to FIG. 4, but viewed from another aspect.

Referring to FIGS. 4 and 5, the connecting arm 40 is longitudinal, including two parallel horizontal plates 42, a side plate 44 extending between the horizontal plates 42 and located at a right end of the connecting arm 40, a connecting plate 46 extending between the horizontal plates 42 and located at a front side of the connecting arm 40, and a rear plate 48 extending between the horizontal plates 42 and located at a rear side of the connecting arm 40.

The horizontal plates 42 are symmetrical to each other. Each of the horizontal plates 42 defines a locking hole 422 and a fastening hole 424 at a right end thereof, and defines a pivotal hole 426 at a left end thereof. The locking holes 422 are aligned, the fastening holes 424 are aligned, and the pivotal holes 426 are aligned. An inner surface of each horizontal plate 42 adjacent to a right end is recessed, to form a guide face 428 in the horizontal plate 42. A step (not labeled) is formed at a front end of the guide face 428. The guide faces 428 of the horizontal plates 42 are aligned.

Figure 8:
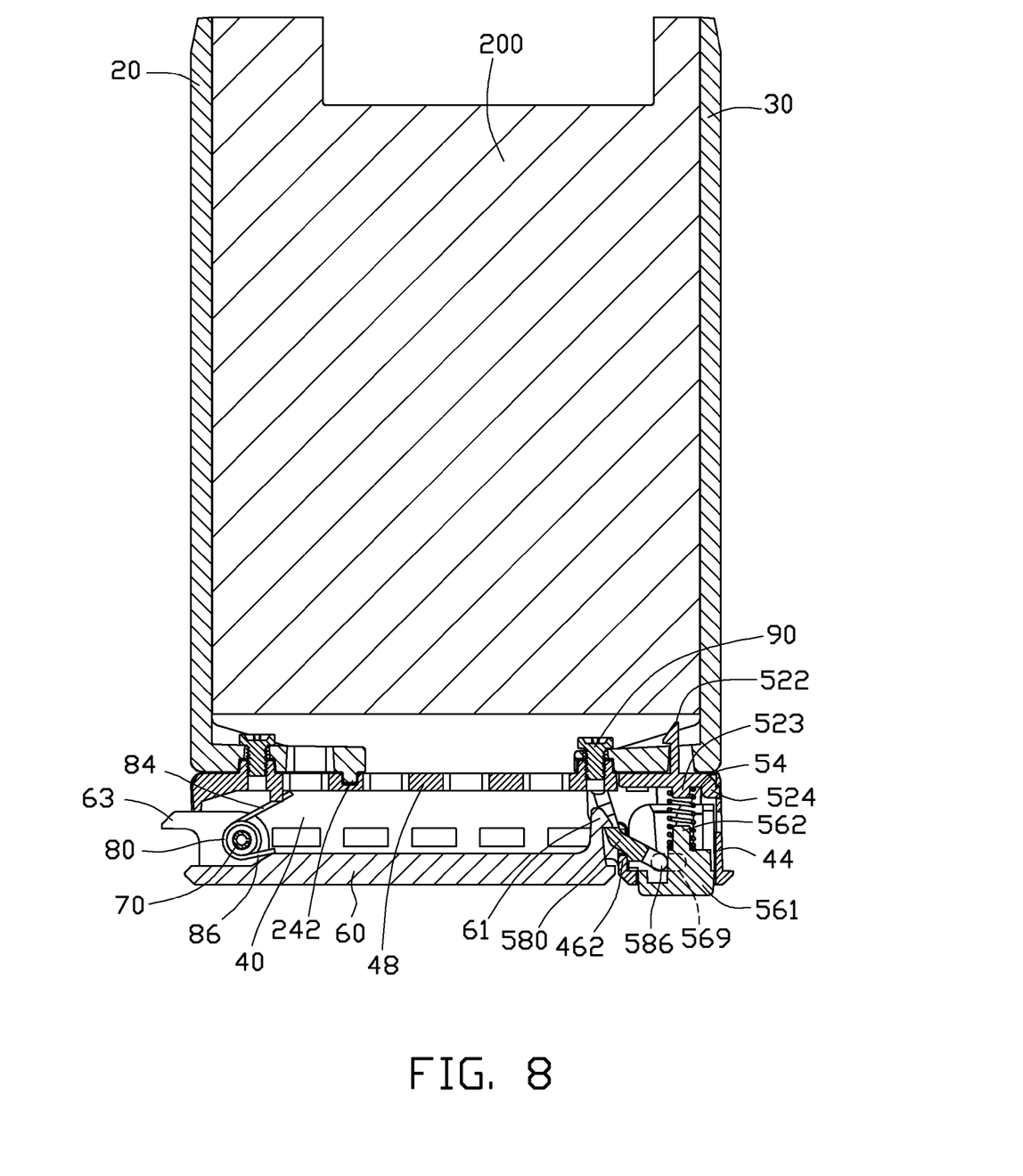
FIG. 8 is a cross section of the HDD holder together with the HDD of FIG. 1, taken along a line VIII-VIII, wherein the HDD holder is in a locked state.

The side plate 44 defines an engaging groove 440 adjacent to a rear side thereof. The connecting plate 46 is substantially rectangular, with a rectangular through hole 460 defined at a central area thereof. Referring to FIG. 8, a baffle-plate 462 extends rearward from a left side of the connecting plate 46. A width of the baffle-plate 462 from front to rear is less than that of the horizontal plate 42 along the same direction. The rear plate 48 is parallel to the connecting plate 46. The rear plate 48 and the connecting plate 46 are staggered longitudinally along the horizontal plate 42. The rear plate 48 forms two mounting posts 482 at two opposite ends thereof, for respectively receiving the securing hole 240, 340 of the first and second mounting arms 20, 30. The mounting posts 482 protrude rearward and perpendicularly from the rear plate 48. Each of the mounting posts 482 defines a threaded hole therein. The rear plate 48 defines an engaging hole 484, for receiving the engaging post 242 of the first mounting arm 20.

The horizontal plates 42, the side plate 44 and the baffle-plate 462 cooperatively define a receiving space therebetween. An opening is defined at a left periphery of the receiving space where the baffle-plate 462 is located.

The clipping assembly 50 includes a base 52, an elastic member 54, a button 56 and a sliding member 58. The base 52 includes a main body 521, and a positioning hook 522 extending perpendicularly and rearward from a rear surface of the main body 521. The positioning hook 522 is configured for being received in the positioning hole 342 of the second mounting arm 30. A securing post 523 with a cross-shaped cross section extends frontward and perpendicularly from a front surface of the main body 521. A protrusion 524 protrudes outwardly from a right lateral side of the main body 521, and received in the engaging groove 440 of the side plate 44. Two blocks 525 respectively protrude from top and bottom lateral sides of the main body 521, to be received in the locking holes 422 of the horizontal plates 42, respectively. Two baffling tabs 527 extend frontward and perpendicularly from a front surface of the main body 521. The baffling tabs 527 are parallel to and spaced from each other.

The elastic member 54 is substantially cylindrical, with an axial central hole 540 defined therethrough. In this embodiment, the elastic member 54 is a compression spring.

The button 56 includes a contact portion 561, and an upper extension portion 564 and a lower extension portion 566 respectively extending rearward from top and bottom sides of the contact portion 561. The contact portion 561 is substantially rectangular, with a size slightly less than that of the through hole 460 of the connecting plate 46. Referring also to FIG. 8, a fixing post 562 extends rearward from a rear surface of the contact portion 561. The upper extension portion 564 and the lower extension portion 566 each form a flange 565, 567 at a distal end thereof. The flanges 565, 567 of the upper and lower extension portions 564, 566 extend oppositely. The upper extension portion 564 and the lower extension portion 566 each define a sliding groove 568, 569 longitudinally along the horizontal plate 42. The sliding grooves 568, 569 of the upper and lower extension portions 564, 566 are aligned.

Figure 6:
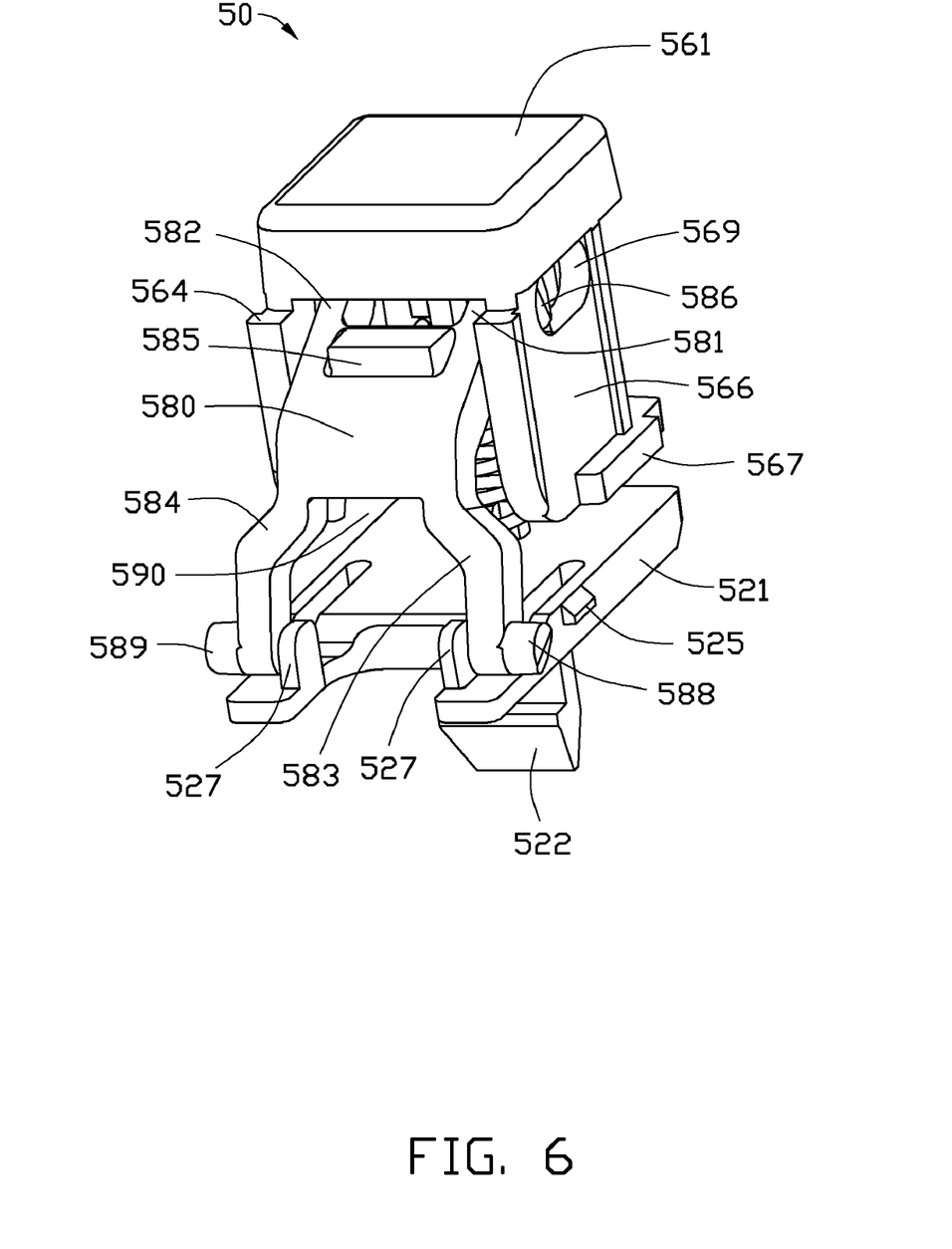
FIG. 6 is an enlarged, isometric, assembled view of the clipping assembly of FIG. 4.

Referring to FIG. 6, the sliding member 58 includes a central body 580, and four legs 581, 582, 583, 584 extending radially from four corners of the central body 580. The central body 580 forms a baffling portion 585 at a top surface thereof. In this embodiment, the baffling portion 585 is triangular, and protrudes outwardly from the top surface of the central body 580. The four legs 581, 582, 583, 584 are respectively designated as a first leg 581, a second leg 582, a third leg 583 and a fourth leg 584. The first and second legs 581, 582, located at a right side of the central body 580, are substantially parallel with each other. The third and fourth legs 583, 584, located at a left side of the central body 580, expand away from each other. The central body 580, the third leg 583 and the fourth leg 584 cooperatively define a locking groove 590. The four legs 581, 582, 583, 584 each form a locking post 586, 587, 588, 589 extending outwardly from a distal end thereof.

Figure 7:
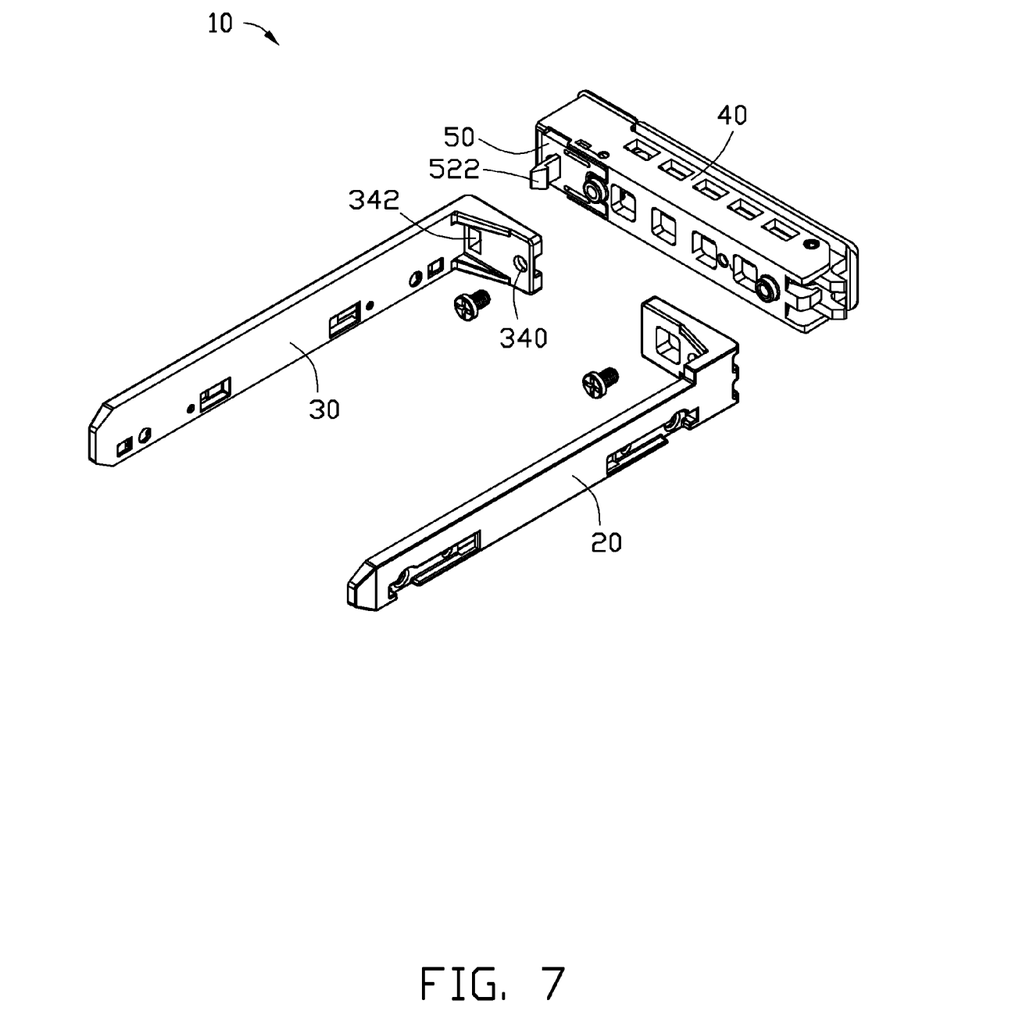
FIG. 7 is a partially, assembled view of the HDD holder of FIG. 3.

Referring to FIGS. 7 and 8, during assembly of the mounting frame 10, the locking posts 586, 587 of the first leg 581 and the second leg 582 of the sliding member 58 are respectively received in the sliding grooves 568, 569 of the upper and lower extension portions 564, 566 of the button 56. The locking posts 586, 587 can slide along the sliding grooves 568, 569, respectively, such that the sliding member 58 can slide relative to the button 56. Then, the button 56 with the sliding member 58 is received in the receiving space of the connecting arm 40, with the contact portion 561 of the button 56 received in the through hole 460 of the connecting plate 46, and the flanges 565, 567 of the extension portions 564, 566 of the button 56 respectively abutting the guide faces 428 of the horizontal plates 42. Therefore, the button 56 is moveable in the receiving space, with the flanges 565, 567 of the button 56 sliding along the guide faces 428. The central body 580 of the sliding member 58 extends through the opening, and the locking posts 588, 589 of the third leg 583 and the fourth leg 584 of the sliding member 58 are respectively received in the fastening holes 424 of the horizontal plates 42. Thus the sliding member 58 is able to pivot relative to the horizontal plates 42.

The base 52 is received in a rear side of the receiving space, with the protrusion 524 received in the engaging groove 440 of the side plate 44, and the blocks 525 respectively received in the locking holes 422 of the horizontal plates 42. Simultaneously, the baffling tabs 527 are located between the third leg 583 and the fourth leg 584 of the sliding member 58, to respectively limit inward movements of the third leg 583 and the fourth leg 584. Thus the locking posts 588, 589 of the third leg 583 and the fourth leg 584 of the sliding member 58 are prevented from departing from the fastening holes 424 of the horizontal plates 42.

The elastic member 54 is located between the button 56 and the base 52, with two ends of the elastic member 54 abutting against the rear surface of the button 56 and the front surface of the base 52. The fixing post 562 of the button 56 extends into a front end of the elastic member 54, and the securing post 523 of the base 52 extends into a rear end of the elastic member 54. When the button 56 is in a relaxed state, the elastic member 54 is pressed between the button 56 and the base 52, and is thus pushed frontward by the elastic member 54. However, the flanges 565, 567 of the button 56 respectively abut the steps of the guide faces 428 of the horizontal plates 42, limiting a frontward movement of the button 56. The baffling portion 585 abuts against the baffle-plate 462 of the connecting plate 46 to limit a leftward movement of the sliding member 58.

Referring to FIGS. 2, 3 and 8, the first mounting arm 20 is connected to a left end of the connecting arm 40, with the engaging post 242 of the first mounting arm 20 received in the engaging hole 484 of the rear plate 48 of the connecting arm 40, and the mounting post 482 of the rear plate 48 aligned with the securing hole 240 of the first mounting arm 20. A fastener 90 is provided to extend through the securing hole 240 and thread into the mounting post 482 of the rear plate 48 of the connecting arm 40, to thereby connect the first mounting arm 20 with the connecting arm 40.

The second mounting arm 30 is connected to a right end of the connecting arm 40, with the positioning hook 522 of the base 52 of the clipping assembly 50 received in the positioning hole 342 of the second mounting arm 30, and the mounting post 482 of the rear plate 48 aligned with the securing hole 340 of the second mounting arm 30. A fastener 90 is provided to extend through the securing hole 340 and thread into the mounting post 482 of the rear plate 48 of the connecting arm 40, to thereby connect the second mounting arm 30 with the connecting arm 40. Thus, the mounting frame 10 is assembled completely, and the first and second mounting arms 20, 30 and the connecting arm 40 cooperatively define a receiving space (not labeled) for receiving the HDD 200.

Then the HDD 200 is fixed in the mounting frame 10 by a plurality of fasteners 90. The fasteners 90 respectively extend through the mounting holes 220, 320 of the first and second mounting arms 20, 30, and thread into the corresponding fixing holes 202 of the HDD 200. Thereby, the HDD 200 is fixed to the mounting frame 10.

When the handle 60 is assembled to the mounting frame 10, one end of the handle 60 where the locking legs 63 are located is positioned between the horizontal plates 42, and the resilient member 80 is located between the two locking legs 63 of the handle 60. The pivotal holes 64 of the locking legs 63 of the handle 60, the main portion 82 of the resilient member 80, and the pivotal holes 426 of the horizontal plates 42 are aligned. Then the shaft 70 extends through the pivotal holes 426 of the horizontal plates 42, the pivotal holes 64 of the handle 60, and the main portion 82 of the resilient member 80, to thereby pivotally connect the handle 60 and connecting arm 40. The first arm 84 of the resilient member 80 abuts against the rear plate 48 of the connecting arm 40, and the second arm 86 of the resilient member 80 abuts against the handle 60. When the resilient member 80 is in a free state, the right end of the handle 60 where the locking hook 61 is located is far away from the connecting arm 40. The handle 60 is in an unlocked state.

Figure 9:
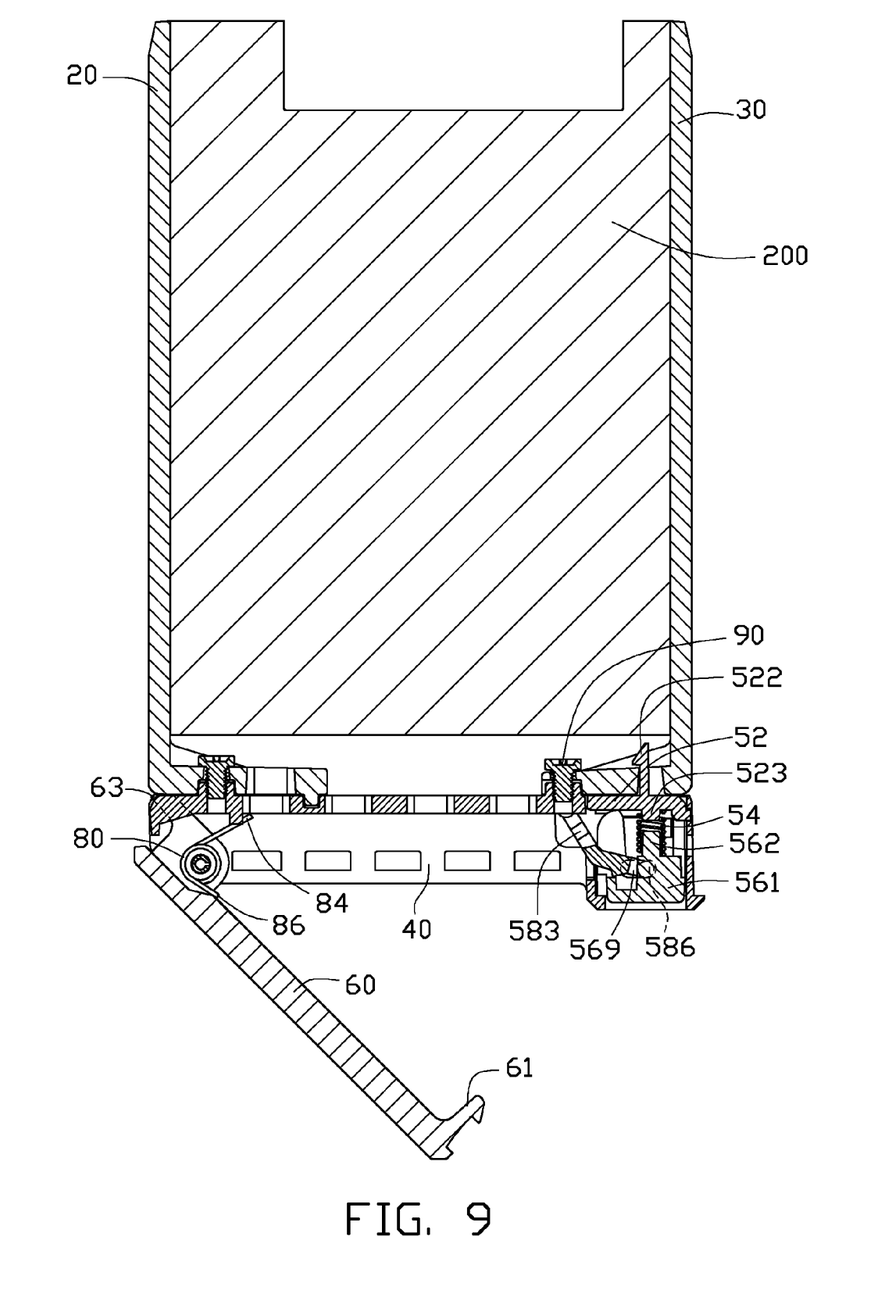
FIG. 9 is similar to FIG. 8, but shows the HDD holder in an unlocked state.

Referring to FIGS. 8-10, when the HDD holder 100 together with the HDD 200 is to be mounted into the enclosure 300, the handle 60 is positioned in an unlocked state, and then the HDD holder 100 together with the HDD 200 is received in the receiving space 306 of the enclosure 300. After the HDD holder 100 has been completely received in the receiving space 306 of the enclosure 300, the handle 60 is pivoted toward the connecting arm 40 until the locking hook 61 is received in the locking groove 590 of the sliding member 58 of the connecting arm 40. At that time, the locking legs 63 extend into the latching groove 308 of the first sidewall 302, and frontward movement is limited. Therefore, the HDD 200 is installed in the enclosure 300. In the locked state, the resilient member 80 is pressed.

If the HDD holder 100 is to be removed, force simply needs be applied to compress the button 56 and cause the button 56 to move rearward. During such movement, the locking posts 586, 587 slide in the sliding groove 568, 569 of the button 56, respectively. Therefore, the right side of the central body 580 of the sliding member 58 is inclined rearward to cause the locking hook 61 to depart from the locking groove 590 of the sliding member 58. By releasing the hooking engagement of the locking hook 61 in the locking groove 590, the resilient member 80 returns to its initial state, and the second arm 86 of the resilient member 80 pushes the handle 60 to pivot with respect to the connecting arm 40. Thereby, the locking leg 63 is drawn back from the latching groove 308, and the HDD holder 100 can be easily removed.

It is to be understood, however, that even though numerous characteristics and advantages of an embodiment(s) have been set forth in the foregoing description, together with details of the structures and functions of the embodiment(s), the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A holder for a hard disk drive, the holder comprising:
  a mounting frame comprising a first mounting arm, a second mounting arm, a connecting arm connecting the first mounting arm with the second mounting arm, and a clipping assembly attached to one end of the connecting arm;
  the connecting arm comprising:
    two parallel horizontal plates;
    a side plate extending between the horizontal plates and located at a right end of the connecting arm, the side plate defining an engaging groove;
    a connecting plate extending between the horizontal plates and located at a front side and adjacent to the right end of the connecting arm; and
    a rear plate extending between the horizontal plates and located at a rear side of the connecting arm, the rear plate and the connecting plate being staggered along a longitudinal axis of the horizontal plates; and
  the clipping assembly comprising:
    a base connected with the second mounting arm, the base comprising a protrusion protruding outwardly, and the protrusion engaged in the engaging groove of the side plate;
    a button received and slidable in the connecting arm;
    an elastic member located between and abutting against the button and the base; and
    a sliding member with one end pivotally connected with the connecting arm, another end of the sliding member slidably connected with the button, the sliding member defining a locking groove therein; and
  a handle comprising a locking hook at one end, another end of the handle pivotally connected with another end of the connecting arm of the mounting frame;
  wherein when the handle is pivoted toward the connecting arm, the locking hook of the handle hooks in the locking groove of the sliding member, and when the button is pressed toward the second mounting arm, the another end of the sliding member slides in the button to cause the locking hook of the handle to depart from the locking groove of the sliding member.

2. The holder of claim 1, wherein the base further comprises two blocks, and each of the horizontal plates defines a locking hole, the locking holes engagingly receiving the blocks of the base, respectively.

3. The holder of claim 1, wherein the button comprises a contact portion, and two extension portions respectively extending from top and bottom sides of the contact portion, each of the extension portions defines a sliding groove therein, the another end of the sliding member comprises two locking posts, and the two locking posts are slidably received in the sliding grooves of the button, respectively.

4. The holder of claim 3, wherein each horizontal plate defines a fastening hole therein, the sliding member further comprises another two locking posts at the one end, and the another two locking posts are received in the fastening holes of the horizontal plates, respectively, to thereby pivotally connect the sliding member and the horizontal plates.

5. The holder of claim 4, wherein the sliding member further comprises two legs at the one end, the another two locking posts are respectively formed on the two legs, the base further comprises two baffling tabs, and the baffling tabs are located between the two legs to respectively limit inward movement of the two legs, whereby the another two locking posts are prevented from departing from the fastening holes of the horizontal plates.

6. The holder of claim 3, wherein each of the extension portions of the button forms a flange at a distal end, and a guide face is recessed from an inner surface of each horizontal plate for corresponding to the flange of one of the extension portions, when the button slides in the connecting arm, the flanges of the button slide along the guide faces, and when the button is in an initial state, the flanges of the button abut against front ends of the guide faces.

7. The holder of claim 1, wherein each of the first mounting arm and the second mounting arm is L-shaped, and each of the first mounting arm and the second mounting arm comprises a main section and a fixing section extending from a front end of the main section, each main section defines a plurality of mounting holes for fixing a hard disk drive, each fixing section defines a securing hole, and the rear plate of the connecting arm forms two mounting posts to respectively engage with the securing holes of the first mounting arm and the second mounting arm.

8. The holder of claim 7, wherein the first mounting arm forms an engaging post, and the rear plate defines an engaging hole to engagingly receive the engaging post of the first mounting arm.

9. The holder of claim 7, wherein the second mounting arm defines a positioning hole, and the clipping assembly forms a positioning hook to engage in the positioning hole of the second mounting arm.

10. The holder of claim 1, wherein the connecting plate forms a baffle-plate at one side opposite to the side plate, and the sliding member forms a baffling portion abutting against the baffle-plate of the connecting plate to limit a movement of the sliding member.

11. The holder of claim 1, further comprising a resilient member, wherein when the locking hook of the handle hooks in the mounting frame, the resilient member is pressed, and when the locking hook departs from the mounting frame, the resilient member resumes its initial state and pushes the handle to pivot away from the mounting frame.

12. The holder of claim 11, wherein the resilient member is a torsion spring, the resilient member comprises a main portion and two arms extending along different directions from the main portion, one arm of the resilient member abuts against the connecting arm, and the other arm of the resilient member abuts against the handle.

13. A holder for a hard disk drive, the holder comprising:
    a mounting frame comprising a first mounting arm, a second mounting arm, an elongate connecting arm connecting the first mounting arm with the second mounting arm, and a clipping assembly attached to a first end of the connecting arm;
    the connecting arm comprising:
        two parallel horizontal plates;
        a side plate extending between the horizontal plates and located at a right end of the connecting arm;
        a connecting plate extending between the horizontal plates and located at a front side and adjacent to the right end of the connecting arm; and
        a rear plate extending between the horizontal plates and located at a rear side of the connecting arm, the rear plate and the connecting plate being staggered along a longitudinal axis of the horizontal plates; and
    the clipping assembly comprising:
        a base connected with the second mounting arm;
        a button received in the first end of the connecting arm and slidable in the first end of the connecting arm along a direction which is transverse to a longitudinal axis of the connecting arm, the button comprising a contact portion, and two extension portions respectively extending from top and bottom sides of the contact portion, each of the extension portions defining a sliding groove therein;
        an elastic member located between and abutting against the button and the base; and
        a sliding member with one end pivotally connected with the connecting arm, another end of the sliding member slidably connected with the button, the sliding member defining a locking groove therein, the another end of the sliding member comprising two locking posts, the two locking posts being slidably received in the sliding grooves of the button, respectively; and
        a handle comprising a locking hook at one end, another end of the handle pivotally connected with a second end of the connecting arm;
    wherein when the handle is pivoted toward the connecting arm, the locking hook of the handle is hooked into the locking groove of the sliding member, and when the button is pressed toward the base, the another end of the sliding member slides in the button to cause the locking hook of the handle to disengage from the locking groove of the sliding member.

14. The holder of claim 13, wherein each horizontal plate defines a fastening hole therein, the sliding member comprises another two locking posts at the one end, and the another two locking posts are received in the fastening holes of the horizontal plates, respectively, to thereby pivotally connect the sliding member and the horizontal plates.

15. The holder of claim 14, wherein the sliding member comprises two legs at the one end, the another two locking posts are respectively formed on the two legs, the base further comprises two baffling tabs, and the baffling tabs are located between the two legs to respectively limit inward movement of the two legs, whereby the another two locking posts are prevented from departing from the fastening holes of the horizontal plates.

16. The holder of claim 13, wherein each of the extension portions of the button forms a flange at a distal end, a guide face is recessed from an inner surface of each horizontal plate for corresponding to the flange of one of the extension portions, when the button slides in the connecting arm, the flanges of the button slide along the guide faces, and when the button is in an initial state, the flanges of the button abut against front ends of the guide faces.

* * * * *